United States Patent [19]

MacKelvie et al.

[11] Patent Number: 4,746,844
[45] Date of Patent: May 24, 1988

[54] CONTROL AND OPERATION OF BRUSHLESS CONTINUOUS TORQUE TOROID MOTOR

[75] Inventors: John S. MacKelvie, Keene; Eric Whiteley, Peterborough, all of Canada

[73] Assignee: Maghemite Inc., Vancouver, Canada

[21] Appl. No.: 886,165

[22] Filed: Jul. 16, 1986

[30] Foreign Application Priority Data

Jul. 16, 1985 [GB] United Kingdom ............... 8517908
Sep. 18, 1985 [GB] United Kingdom ............... 8523100

[51] Int. Cl.⁴ .................... H02K 29/00; H02P 6/02
[52] U.S. Cl. ................................... 318/254; 318/138; 318/439; 310/68 R; 310/267
[58] Field of Search ............. 318/138, 254, 439; 310/267, 268, 68 R

[56] References Cited

U.S. PATENT DOCUMENTS

| | | | |
|---|---|---|---|
| 3,023,348 | 2/1962 | Cox ................................. | 318/138 |
| 3,200,315 | 8/1965 | Thompson ........................ | 318/138 |
| 3,559,014 | 1/1971 | Rakes ............................... | 318/138 |
| 3,863,336 | 2/1975 | Noto et al. ...................... | 310/268 X |
| 4,103,197 | 7/1978 | Ikegami et al. ................. | 310/267 |
| 4,256,997 | 3/1981 | Brusaglino et al. ............ | 318/254 |
| 4,484,115 | 11/1984 | Takahashi ....................... | 318/254 |
| 4,495,450 | 1/1985 | Tokizaki et al. ................ | 318/138 |

FOREIGN PATENT DOCUMENTS

55-74394 6/1980 Japan ............................... 318/254

Primary Examiner—Bentsu Ro
Attorney, Agent, or Firm—Sim & McBurney

[57] ABSTRACT

Novel winding arrangements and control circuits for brushless direct-current motors are described. Stator windings are arranged to produce an essentially continuous torque in each winding phase from D.C. current pulses each of about one-half the duration of a two-pole cycle or rotor movement. An electronic control circuit comprises one electronic power switch for each winding group or winding phase in the stator windings. One or two D.C. current pulses are applied to the windings for each two-pole cycle of rotor movement, depending on the arrangement of the coils. CEMF voltage generated in the coils is sensed and a change in the polarity thereof is used to control switching of the D.C. current between coils.

11 Claims, 12 Drawing Sheets

PARTS LIST.
DESCRIPTION: Electronic control for Demonstration Motor BFDMT12.

| Part # | NAME | QUANTITY | MATERIAL |
|---|---|---|---|
| 01 | SW A,B,C,D | 8 | HEXFET IRFZ20 |
| 02 | Q1,2,3,4(A,C) 6,7,10,11 | 20 | TRANSISTOR ZN3906 |
| 03 | Q5(A,C),8,9 | 6 | TRANSISTOR ZN3904 |
| 05 | IC1,2,3 | 3 | DUAL D FLIP FLOP MC4013 |
| 06 | IC4 | 1 | TIMER TLC555 |
| 10 | D1,2,3,4(A,C) 5,6,7,8 | 20 | DIODE 1N914 |
| 11 | Z1,2(A,B,C,D) | 16 | ZENER DIODE 15V,5W 1N535Z13 |
| 12 | 23(A,C) | 4 | ZENER DIODE 6.2V, 1W 1N4735A |
| 15 | R1,5(A,C),19,20 | 10 | RESISTOR 1/4W 5% 1.0k |
| 16 | R2,3(A,C),13 | 9 | "    "    2.2k |
| 17 | R4(A,C) | 4 | "    "    100 k por² |
| 18 | R6,7,8,9(A,C) 10,11,12 | 19 | "    "    10 k |
| 19 | R12 | 1 | "    "    1 Meg por² |
| 20 | R17,18 | 2 | "    "    15 k |
| 21 | R14,15,16 | 3 | "    "    22 k |
| 25 | C1(A,C) | 4 | CAPACITOR,TANTALUM 1.0µF |
| 26 | C2(A,C) | 4 | "    "    .47µF |
| 27 | C3(A,C),4,5,6 | 6 | "    CERAMIC .1µF |
| 28 | C7,8 | 2 | TANTALUM 22µF |

CONTROL AND OPERATION OF BRUSHLESS CONTINUOUS TORQUE TOROID MOTOR

FIELD OF INVENTION

The present invention relates to the control of electric motors, in particular ferrite toroid motors.

BACKGROUND TO THE INVENTION

Ferrite toroid motors are a form of brushless D.C. motor and are fully described in copending U.S. patent application Ser. No. 703,388 filed Feb. 20, 1985, (now U.S. Pat. No. 4,605,874) assigned to the assignee hereof, the disclosure of which is incorporated herein by reference. As is set forth in detail in said copending U.S. patent application, the novel brushless D.C. dynamo-electric machine described therein comprises a disk-like rotor element comprising hard ferrite toroid means providing a plurality of magnetic poles of alternating polarity and mounted for rotation about its axis; a disk-like stator element comprising soft ferrite toroid means and mounted coaxially with and spaced apart from the rotor element, the soft ferrite toroid means being formed with radially-directed coil winding receiving slots; and electrical coil windings mounted to the stator in the slots and each spanning one rotor pole pitch.

Such ferrite motors operate from a D.C. electrical power source by means of electronic control circuits. The functioning of conventional brushless motor/control systems is determined largely by control logic circuits and electronic power switching devices, the timing of which is controlled by the logic circuits. These controls tend to be sophisticated and often are much more expensive to build than the motors which they control, particularly with small motors.

Toroid motors are inherently suited to automated mass production as described in the above-mentioned U.S. copending patent application, and, therefore, are functionally attractive for use in consumer products, such as automobiles or household appliances. In these applications, however, low manufacturing costs are necessary to ensure widespread market acceptance, both in terms of the motor and the control circuit.

There exists a need, therefore, for a very simple control circuit utilizing low cost electronic elements for use in controlling toroid motors, in particular, and electric motors, in general.

SUMMARY OF INVENTION

In accordance with the present invention, there are provided improvements in a brushless direct-current motor comprising a permanent magnet rotor having a plurality of magnetic poles and a stator bearing windings arranged to interact with the magnetic field produced by the magnetic poles so as to produce torque from D.C. current applied to the windings.

The improvements reside in the provision of stator windings arranged to produce an essentially continuous torque in each winding phase from D.C. current pulses each of about one-half the duration of a two-pole cycle of rotor movement and an electronic control circuit for the motor comprising one electronic power switch per winding group or phase group.

The motor winding arrangement provided herein permits a winding to produce useful torque from one or two D.C. current pulses for each two-pole cycle of rotor movement while at the same time requiring only one electronic power switch per winding group or phase group and only one logic system per phase to both turn on and turn off the phase switch. Each D.C. current pulse is essentially of half-cycle duration.

The present invention also includes a novel method of operating a brushless D.C. motor which has at least two separate circuit windings which are alternately pulsed with D.C. current from a power source by the opening and closing of individual electronic power switches. The invention resides in using changes in polarity of the counter-EMF (CEMF) generated in the circuits during motor operation to effect the opening and closing of the switches.

BRIEF DESCRIPTION OF DRAWINGS

FIG. 21 is a parts list for the circuits shown in FIGS. 18 to 20.

GENERAL DESCRIPTION OF INVENTION

Figure 1:
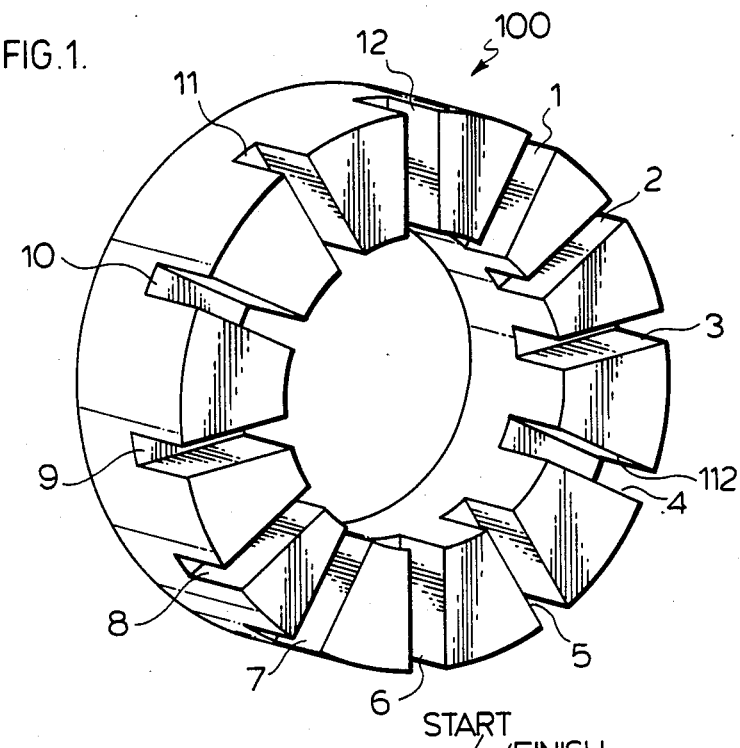
FIG. 1 is a perspective view of a toroid stator having twelve winding-receiving slots.

The present invention arises from consideration of motor operation and control principles. Brushless D.C.

motors develop mechanical torque from pulses of D.C. current in phased windings in the motor, which interact with magnetic flux from permanent magnet poles on a rotor. The windings have phased groups of coils which are spaced from each other in a relationship suitable for sequential pulsing in synchronism with rotation of the rotor and its magnetized poles. From a single D.C. power source, the current pulses have a single polarity or direction of flow. However, in the motor a winding group experiences alternatively north and south magnetic flux as the rotor poles move past a coil in the stationary winding. In many brushless motor systems, this alternation of flux polarity is used to produce useful torque by alternating the winding terminals to which the electrical pulses are applied, conventionally requiring two electronic power switches per winding group or phase group. The power switches account for a major portion of the costs of the control circuit and require independent logic timing control circuits, which again adds to the cost.

In contrast, the motor winding arrangement of the invention enables useful torque to be produced from one or two D.C. current pulses for each two-pole cycle of rotor movement, while requiring only one electronic power switch per winding group or phase group and only one logic system per phase to both turn on and turn off the phase switch.

The motor winding arrangement of the invention preferably also is sub-divided within each phase group of coils to the extent that lower power electronic switches can be used in parallel to control effectively large phase current pulses.

The motor winding arrangement of the present invention enables a minimum cost control system to be realized since the minimum number of phases, the minimum number of power switches and the minimum number of logic circuits are employed. The use of low-power switches enables the costs to be decreased since such switches are much less costly than high-power switches and several low-power switches are less costly than one equivalent high-power switch.

Features of the motor winding arrangement and motor control operation of the present invention, hereinafter called "Unipulse" winding system for convenience, are discussed in more detail below.

Low-cost, low-current, electronic power switches are used in parallel to control large pulse currents, such as are required for significant motor power levels, especially in low voltage situations, e.g. 12 volts D.C.

To make practical the turning on and off of several power switches in parallel with different rates of switching, the motor windings have the same number of parallel circuits per phase as there are switches in parallel. Each unit switch controls only the current pulse in its own motor circuit, and each motor circuit determines that its current pulse matches the current rating of its switch. The motor circuits are not sensitive to precise current pulse timing.

Because timing of these parallel electronic switches is not critical, they can be turned on or off in parallel by a single logic control signal. One logic circuit may handle any number of parallel power switches.

The Unipulse winding is quite simple, with one stator slot per pole per phase. The number of phases is kept to a minimum, preferably two, perhaps three, to limit the number of timing-logic circuits required at one per phase.

The Unipulse system includes two modes of operation. In one such mode of operation, one pulse per phase per two-pole rotor movement cycle is employed and this mode is referred to herein as the "integral" mode. This mode may be preferred in small motors where few parallel power switches are needed. With integral Unipulse windings, there is only one unidirectional current pulse per phase per cycle. This mode is only preferred for smaller motors, where the resulting current and torque pulsations are acceptable.

In another mode of operation, two pulses per phase per two-pole rotor movement cycle are employed and this mode is referred to herein as the "split-phase" mode. This mode is preferred for motors where there are enough power switches in parallel per phase to require two or more parallel winding circuits per phase. The parallel phase circuits are then displaced relative to each other in the motor stator by one rotor pole pitch.

With split-phase Unipulse windings, a uniform overall current flow and smooth torque production is obtained by matching pulse durations, having phase pulses overlapping in time, and having two pulses per phase per two-pole movement of the rotor. This result is accomplished by having the circuits into which a phase group of coils is divided displaced in the motor stator by one rotor pole pitch, relative to each other. In this arrangement, one phase circuit is pulsed as a north pole on the rotor passes a point on the stator, and another circuit in the same phase is pulsed when a south pole on the rotor passes the same point on the stator. The same logic signal which turns on the displaced circuit also turns off the pulse in the basic circuit of the same phase. This type of Unipulse winding can have more than one coil per slot.

The system of motor circuits and parallel operated switches provided herein is suitable for a range of D.C. current requirements, by varying the number of phases, the parallel circuits per phase, and pulses per cycle. For example, the following combinations are possible:

| # SWITCHES | # PHASES | CCT/PHASE | PULSES/CYCLE |
| --- | --- | --- | --- |
| 2 | 2 | 1 | 1 |
| 3 | 3 | 1 | 1 |
| 4 | 2 | 2 | 2 |
| 6 | 2 | 3 | 2 |
| 6 | 3 | 2 | 2 |
| 8 | 2 | 4 | 2 |
| 9 | 3 | 3 | 3 |

The system of the present invention is independent of the number of poles on the rotor, except to the extent that the number of coils in a phase circuit should be integral and some sub-multiple of the number of poles.

DESCRIPTION OF PREFERRED EMBODIMENTS

Referring to the drawings, there is illustrated therein a specific embodiment of a two-phase, four-circuit per phase, split-phase winding, in a toroid motor having six permanent magnet poles on the rotor (not shown), as well as specific control circuits therefor. Details of the structure of the permanent magnet rotor are illustrated in the aforementioned U.S. patent application Ser. No. 703,388.

Figure 2:
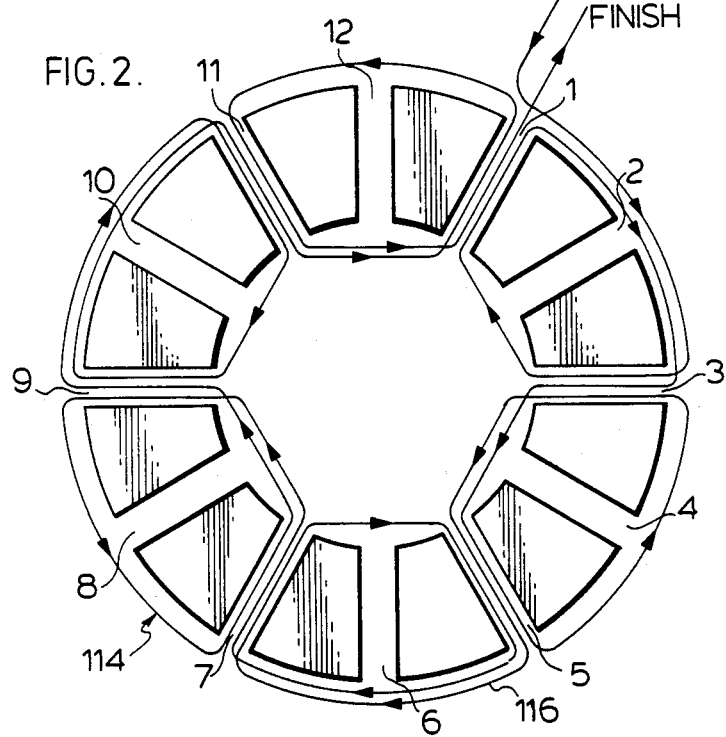
FIG. 2 is a front elevational view of the stator of FIG. 1 illustrating the winding of the coils into the stator slots for phase one.
Figure 3:
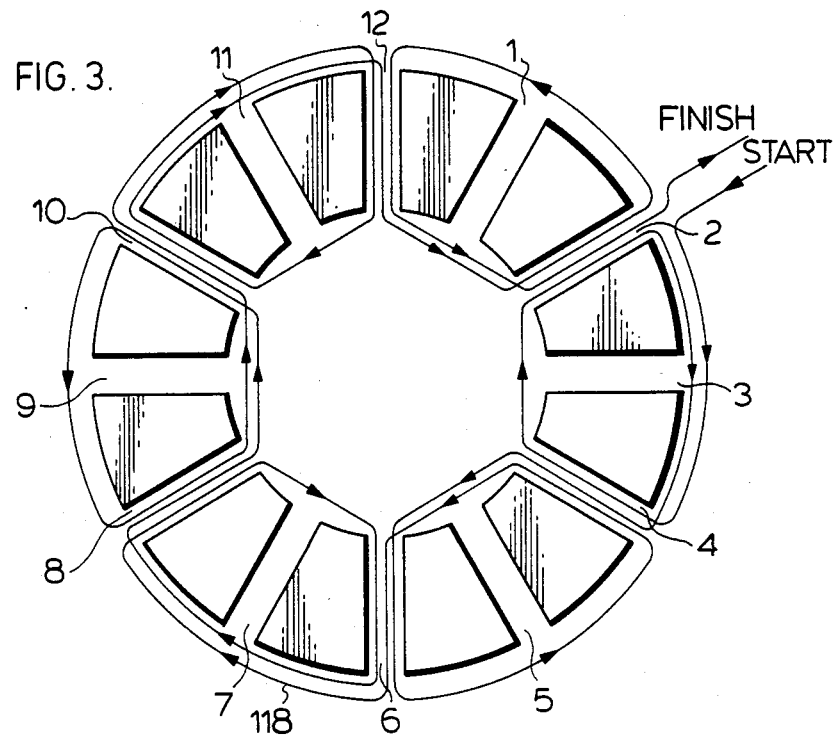
FIG. 3 is a front elevational view of the stator of FIG. 1 illustrating the winding of the coils into the stator slots for phase two.

Referring first to FIGS. 1 to 5, a toroid stator 100 has twelve slots 112 into which the windings 114 are inserted. For ease of illustration the slots 112 are numbered from 1 to 12, as seen in FIG. 1. The wire coils 116 for phase one are wound into the slots numbered 1, 3, 5, 7, 9 and 11, as seen in FIG. 2. The wire coils 118 for phase two are wound into the slots numbered 2, 4, 6, 8, 10 and 12, as seen in FIG. 3. There are thus six coils for each circuit for each phase in this winding.

The direction in which each coil 116 or 118 is wound reverse with each successive coil, so as to produce alternate poles in response to the D.C. current pulses. As seen in FIG. 2, coil #1 is wound into slots 1 and 3 in a clockwise direction from start to finish. The end of coil #1 connects to the start of coil #2, which is wound into slots 3 and 5 but now in a counter-clockwise direction. The end of coil #2 connects to the start of coil #3, which is wound into slots 5 and 7, in a clockwise direction. The end of coil #3 connects to the start of coil #4, which is wound into slots 7 and 9 in a counter-clockwise direction. Coil #4 connects to coil #5 in slots 9 and 11 and clockwise in direction. Coil #5 connects to coil #6 in slots 11 and 1 and is counter-clockwise in direction. The "start" of this circuit is the starting lead of coil #1 and the "finish" is the end lead of coil #6.

Figure 4:
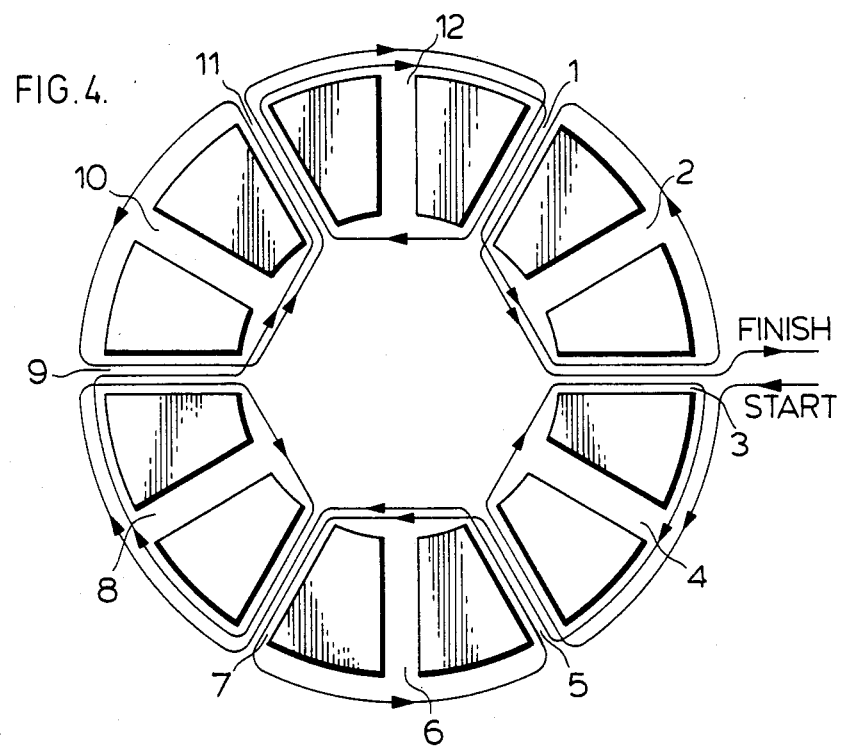
FIG. 4 is a front elevational view of the stator of FIG. 1 illustrating the winding of the coils to achieve a "split phase" effect for the phase one winding.

The windings 114 may be subdivided into a plurality of parallel circuits. In this illustrated embodiment, four circuits are provided in parallel for each phase. All the circuits for phase one are wound into slots 1, 3, 5, 7, 9 and 11, as noted above. To obtain the "split-phase" effect, two of the parallel circuits start at slot #1, and the two parallel circuits start at slot #3, a displacement of one rotor pole pitch. As seen in FIG. 4, in this displaced circuit, coil #1 in slots 3 and 5 is wound in a clockwise direction, whereas coil #2 in the non-displaced circuit also located in slots 3 and 5 is wound counter-clockwise, as described above. This coil displacement and change in winding direction is essential to the split phase embodiment of the Unipulse winding system, since it permits a displaced circuit to be pulsed, by the controls, one rotor-pole pitch later than a non-displaced circuit in the same phase, while both pulses are of the same D.C. polarity. The direction of displacement of the coils is not necessarily in the same direction as the motor rotor rotation. Motor rotation is determined by the sequencing of pulses to the winding circuits by control circuits.

With four circuits per phase, two circuits are located in the basic slot location and the other two circuits are in the displaced location. For each pair of slots, there are four circuits, two wound in the clockwise direction and two wound in the counter-clockwise direction. In each case, there can be two sets of identical coils. An alternative is to wind one coil set with two conductors in parallel with the ends of these parallel conductors then forming the start and finish leads for two circuits.

The same relative coil arrangement also is employed in phase two, except that the corresponding coils 118 in phase two are displaced from phase one coils 116 by one stator slot pitch, so that, for example, slot 1 for phase one corresponds to slot 2 for phase two.

Figure 5:
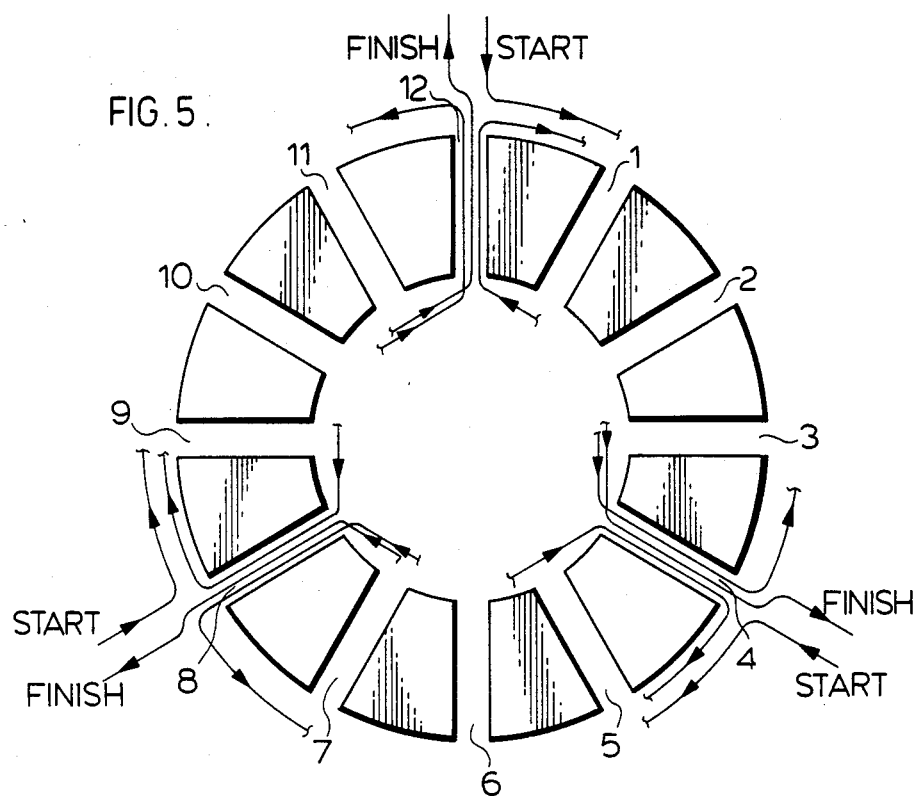
FIG. 5 is a front elevational view of the stator of FIG. 1 illustrating the winding of the coils to achieve a "split phase" effect for the phase two winding.

The start and finish lead locations of these winding coil-groups have been described in terms of specific stator slot numbers for a specific embodiment, and the principles involved are applicable to a wide range of structures. The functioning of a specific coil-group depends only on the direction in which each coil is wound, the relative slots in which coils are located, and the current in the coils when a coil-group is pulsed by the controls. Therefore, for each coil-group in this kind of winding, there are optional slot locations for the start and finish conductors. FIG. 5 shows the options for the displaced circuits of phase two for the specific illustrated embodiment. These options may be used in a Unipulse motor and control system design to locate winding terminal wires conveniently close to their electronic power switch locations on a control circuit board associated with that motor and mounted in its housing.

Figure 6:
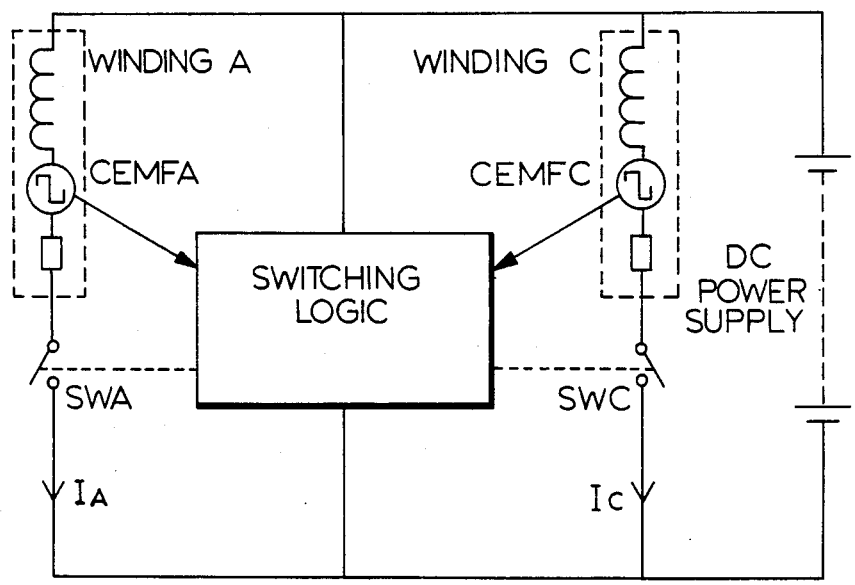
FIG. 6 illustrates schematically a one-phase running circuit for a split-phase winding.

The control of the motor operation now will be described with reference to FIGS. 6 to 21. The basic electronic circuit which is used is a power multivibrator switched between stable states by counter-EMF (CEMF), or back-EMF, in the motor windings, as that CEMF changes in polarity as a result of movement of the alternate north and south permanent magnet rotor poles past the stationary motor windings. A one-phase circuit for a split-phase winding is shown in FIG. 6. The switching elements of the multivibrator circuit are discussed in more detail below with respect to FIG. 13. Winding A corresponds to the "basic circuit" phase one motor winding described above, while winding C then is the "displaced circuit" phase one motor winding. Electronic switches, SWA and SWC are interconnected through the logic electronics so that as SWA closes then SWC opens, and vice versa.

The windings are depicted in FIG. 6 as a pure inductance in series with the CEMF and ohmic resistance. An alternating current CEMF is generated in the coils as the rotor moves. When the switch to a winding circuit is closed and direct current is flowing in that winding, the CEMF is hidden from the winding terminals by the applied voltage and adds to the internal IR voltage drop to equal the applied D.C. battery voltage. However, when the current in the circuit is zero, i.e. the power switch for the particular winding circuit is open, the CEMF is directly observable at the winding terminals and is employed, in accordance with one embodiment of this invention, to close its associated power switch when it changes polarity.

Figure 7:
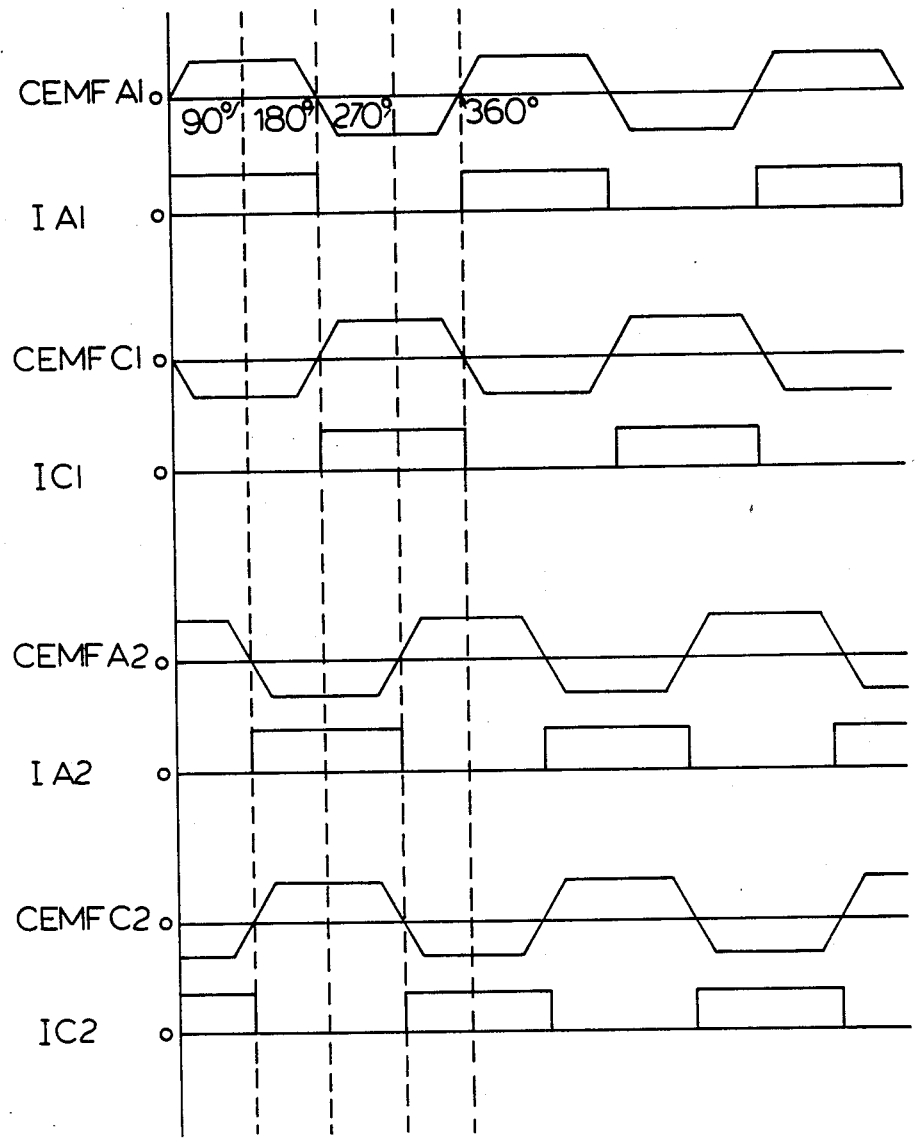
FIG. 7 illustrates the idealized current pulses produced by the electronic circuit of FIG. 6.

Ideally, windings A and C carry current with a 50% duty cycle which is half of the CEMF cycle, during which the windings can produce motor torque from the D.C. current pulse interacting with the rotor magnet polarity at that location at that time. In practice, as described in more detail below, the current duty cycle is limited to about 35 to 40%. Windings A and C are phase displaced in time to produce CEMF voltages displaced in time, as shown in FIG. 7. Control switches SWA and SWC are then actuated by the control logic to produce the winding current pulses shown, idealized, in FIG. 7 for a two-phase split phase system. As may be seen in FIG. 7, these pulses are in time anti-phase. Control of the conduction pulse length of the switches is discussed in more detail below with respect to FIG. 14.

The pulsing pattern just described produces a more or less continuous torque from each phase group of windings. A Unipulse motor employing split phase windings thus develops a relatively smooth torque output with a few phases only being necessary. The specific embodiment of a two-phase system has a smooth torque output and may be used to realize the Unipulse system objective of simple and low-cost controls, while at the same time providing superior motor performance.

Figure 8:
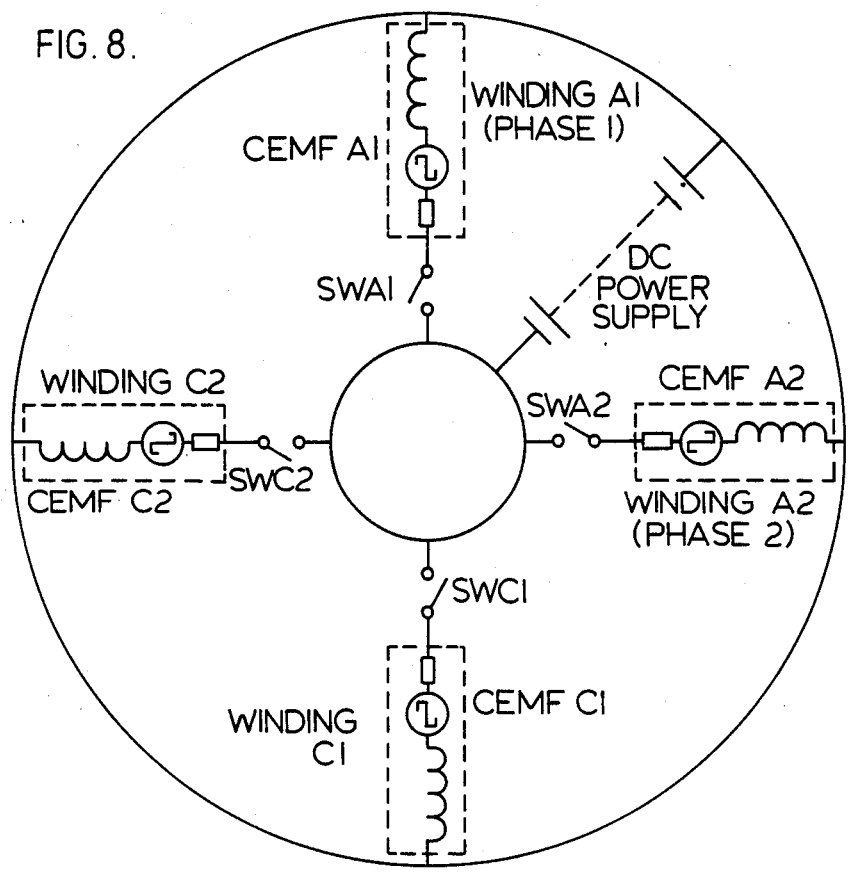
FIG. 8 illustrates a two-phase control system comprising two units of the one-phase circuit of FIG. 6.

The two-phase control system consists of two of the basic circuits described above with respect to FIG. 6 and as shown in FIG. 8. Each phase group is displaced from the other by 90 electrical degrees, the appropriate displacement for a two-phase system. Thus, the designations A1 and C1 refer to the phase one windings and A2 and C2 refer to the phase two windings. This phase displacement is produced by the relative positions of the windings in the motor slots and reflects to the controls in CEMF voltages.

Referring to FIG. 8, using winding A1 as the starting point of a two-phase pulse cycle, switch SWA1 (phase one circuit) closes at 0 degrees electrical. Later, at 90 degrees electrical switch SWA2 (phase two circuit) closes while switch SWC2 opens. At 180 degrees electrical, SWA1 opens and SWC1 closes. At 270 degrees electrical, SWA2 opens and SWC2 closes. At 360 degrees electrical, SWC1 opens and SWA1 closes, to begin the next cycle. In this system, as one switch of one phase opens there is another switch of the same phase which closes. As can be seen from this description, in each phase the basic and displaced windings are sequentially pulsed for 180° of electrical displacement, while the two phases are offset by 90° electrical from each other and hence overlap, as may be seen from the current pulse illustration of FIG. 7.

As noted above, the motor windings are sub-divided into parallel circuits to suit the current rating of low-cost electronic power switches in the control system. In control circut for the illustrated embodiment, each of the switches described so far has a second switch in parallel with it, since all the motor winding divisions have two circuits in parallel. The type of electronic power switch used in these controls may allow two switches in each case to operate from one logic circuit. A Unipulse system can have any number of power switches operating from one logic circuit in parallel, for winding circuits which are pulsed at the same time. This feature contributes to the simplicity and low cost objectives of a Unipulse control system. International Rectifier IRFZ20 power field effect transistors (Hexfets) typically may be employed in the control circuits as the power switches. Their selection is based on the voltage-only switching signal requirement of the FET, high switching speed, low $R_{DS}(on)$ (i.e., low on-state resistance) and low cost.

Figure 9:
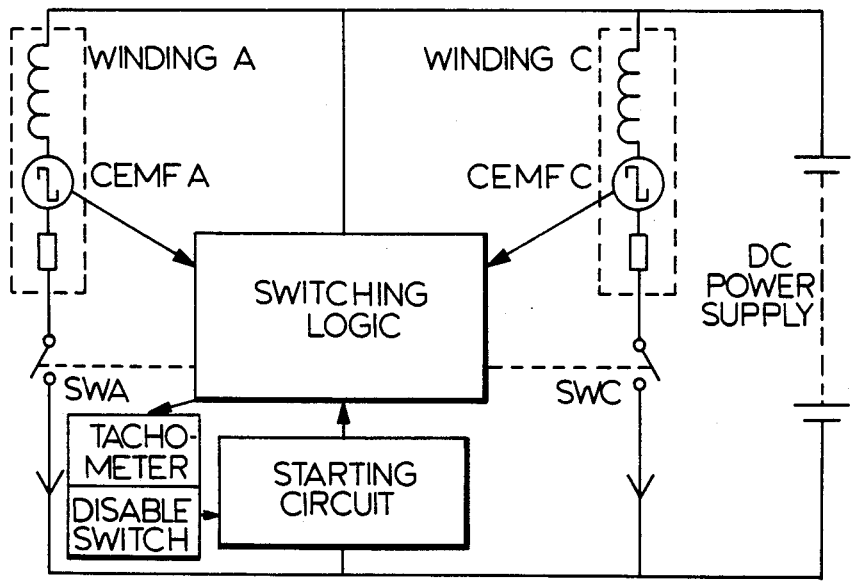
FIG. 9 illustrates schematically a starting circuit for the motor.

When the motor rotor is stationary, CEMF voltages are all zero and the above-described circuits do not initiate any power switching to the motor windings. To provide start-up switching, there is added to the control circuit a slow-timing square-wave generator which feeds switching signals into the switching logic system of FIGS. 6 and 8 in a time and phase sequence to create torque in the motor. This torque then accelerates the rotor, and CEMF thereby is generated. The magnitude of these CEMF voltages increases with increasing motor RPM. When the magnitude of the RPM is sufficient, the running logic circuits begin to work from the alternating current CEMF signals, and power pulses then are timed from the running logic rather than from the starting circuit logic. The starting signals then are removed by disabling the square wave generator as the motor RPM reaches and exceeds a predetermined value, as determined by a simple tachometer. FIG. 9 illustrates details of the integration of the starting circuit into the control circuit. Further description of the circuit appears below in discussion of FIGS. 15 and 16.

The magnitude of the CEMF in a winding acts to determine the magnitude of the current which flows in that winding when an external D.C. voltage is applied to it. At full motor speed, the CEMF can be in the order of 60% of the D.C. applied voltage. The peak pulse current is proportional to the difference between the applied voltage and the CEMF voltage. Accordingly, at decreased motor speeds, the same applied voltage encounters a lesser CEMF opposing voltage and the resultinig pulse current is proportionately greater and may be up to double rated value or more. Electronic power switches generally are vulnerable to excess current conditions, even for short periods of time. To protect these switch devices from overheating at decreased motor speeds, over-current protection logic preferably is included in the control circuit.

Figure 10:
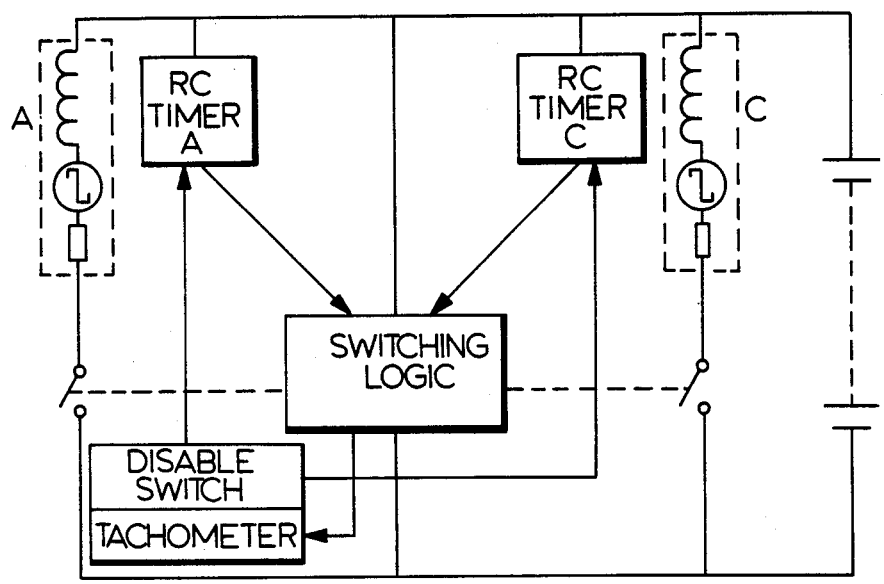
FIG. 10 illustrates the provision of over-current protection and negative torque suppression in the circuit of FIG. 6.

The inclusion of an overcurrent protection circuit in the electronic circuit of FIG. 6 is illustrated in FIG. 10. The overcurrent protection circuit maintains the current pulse length at a constant value which is appropriate to rated speed. At lower speeds, this control function results in a lower duty cycle which tends to compensate for the higher peak currents arising.

This same circuit also prevents negative torque which may occur if the power switch continues to conduct after the CEMF has reversed polarity. The possibility of this happening is occasioned by the time delay in the logic switching system caused by the filters which suppress the switching pulses induced in windings due to mutual coupling. The negative torque is avoided by adjusting the current pulse length.

At start-up, the duty cycle is almost zero and, therefore, little torque is developed. The control system is disabled during start-up and cuts in when a given value of RPM is reached. Prior to that condition, the duty cycle is about 50%, current peaks are high and negative torque is present.

Figure 11:
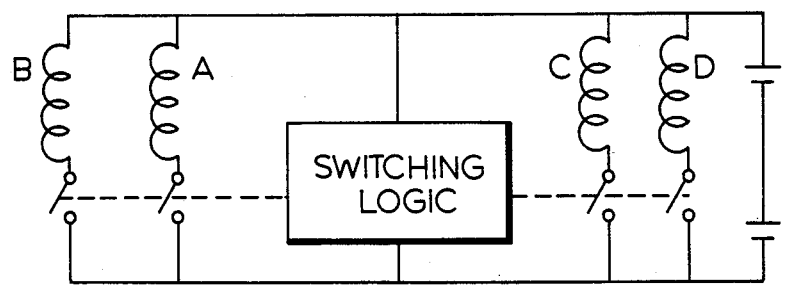
FIG. 11 illustrates the parallel circuits and switches of the motor windings in the circuit of FIG. 6.
Figure 12:
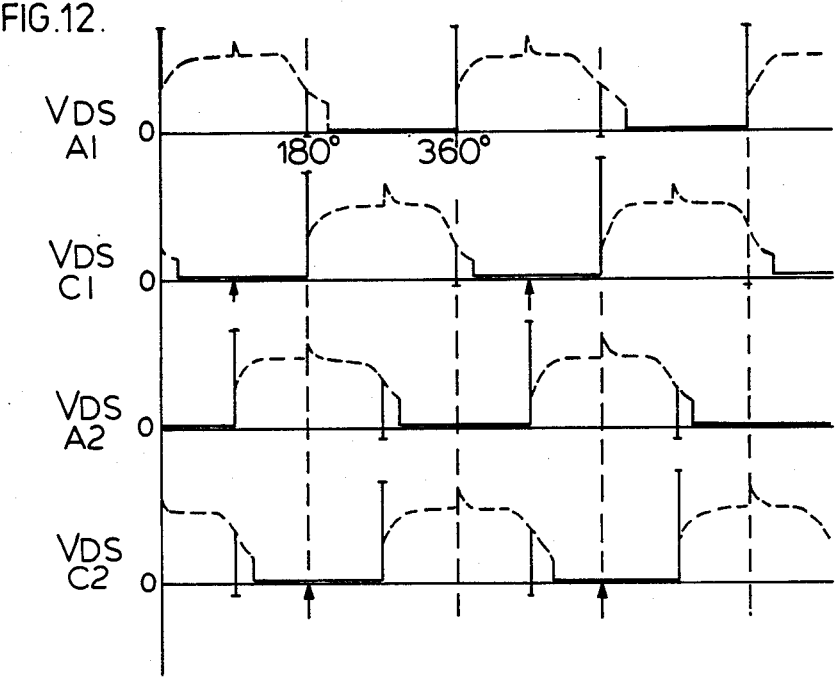
FIG. 12 illustrates the actual waveform for the inductive energy transfer in the circuit of FIG. 6.

As noted earlier, the motor windings of the motor may be sub-divided into two parallel circuits to suit the current ratings of the low cost power switches. These switches share input signals from the logic circuit to their gates but operate with independent drain connections. The circuit employed is shown in FIG. 11.

The design of the Unipulse magnetic and winding structures is such as to minimize the self-inductance of the windings and therefore of the stored energy that must be removed when a power switch turns off. As may be seen in FIG. 12, the CEMF part of the Vds waveforms are not as clean as the idealized waveforms in FIG. 7. Since the switching logic is required to switch at the change of polarity of the CEMFs and to ignore brief individual CEMF excursions, adequate filtering is necessary to achieve this result. It is this filtering that is responsible for the delay in switch-on of the power switches and for the limiting of the duty cycle to 35 to 40%, as discussed above with reference to FIG. 6.

Figure 13:
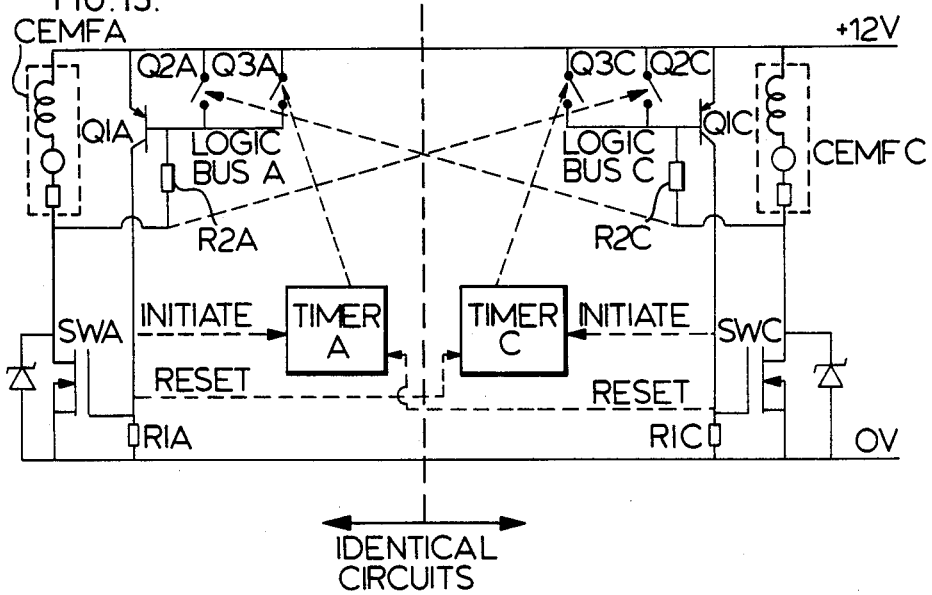
FIG. 13 illustrates the switching logic elements for the circuit of FIG. 6.

The switching elements of the power multivibrator circuit of FIGS. 6 and 9 are illustrated in FIG. 13. Q1A and Q1C are drivers connected to SWA and SWC in a positive feedback configuration. Each collector and drain current is zero until its associated CEMF swings to the correct polarity and draws current through R2 and the Q1 base, which results in a rapid turn-on of Q1 and the power switch. Turn-off is accomplished by short-circuiting the Q1 base and emitter leads. During start-up, Q1 turn-off is performed by the non-associated CEMF switching on Q2, and, when running, by the timer switching on Q3. The timers derive their "initiate timing" and "reset" signals from the power switch gates. As can be seen from this description, the driver Q1 base lead functions as a logic bus.

Figure 14:
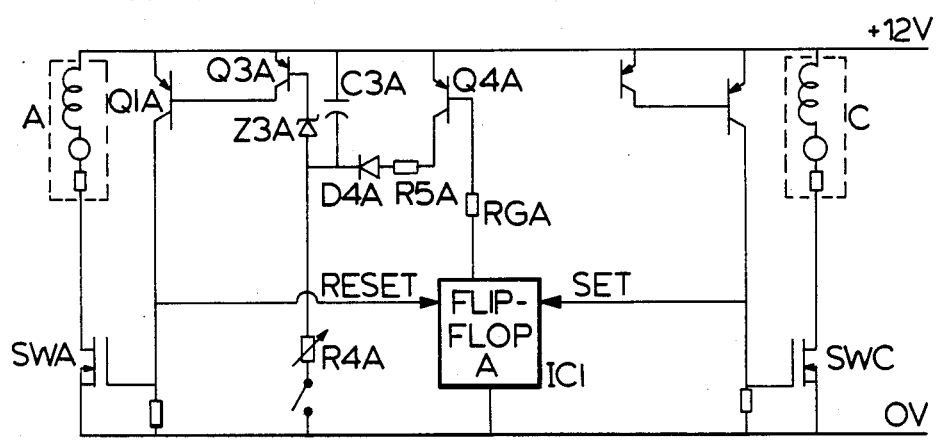
FIG. 14 illustrates the RC timer circuit employed in the circuit of FIG. 6.

When the motor is running, the conduction pulse length of each power switch is controlled by its own RC timer. The timer circuit is shown in FIG. 14. The operation of this circuit can be understood by taking SWA as an example. At the instant before turn-on of SWA, the voltage across C3A is zero, Q3A is off and Q4A is on. When SWA turns on, its gate-to-source voltage resets the A flip-flop in integrated circuit IC1 and Q4A turns off, permitting C3A to charge exponentially through R4A. The voltage across C3A increases to a level at which Zener diode Z3A breaks over, thus turning on Q3A, which causes SWA to turn off. C3A retains a constant voltage until SWC turns on, setting the A flip-flop, which turns on Q4A. C3A then discharges quickly through D4A, R5A and Q4A. The conduction pulse length is determined by the time constant R4A×C3A. R4A may be a variable resistor which can be adjusted to cause turn-off as the CEMF passes through zero.

The switch in series with R4A is open during starting, thus disabling the pulse length control circuit and is closed during motor running. The SWC conduction pulse length is controlled by an identical timing circuit.

Figure 15:
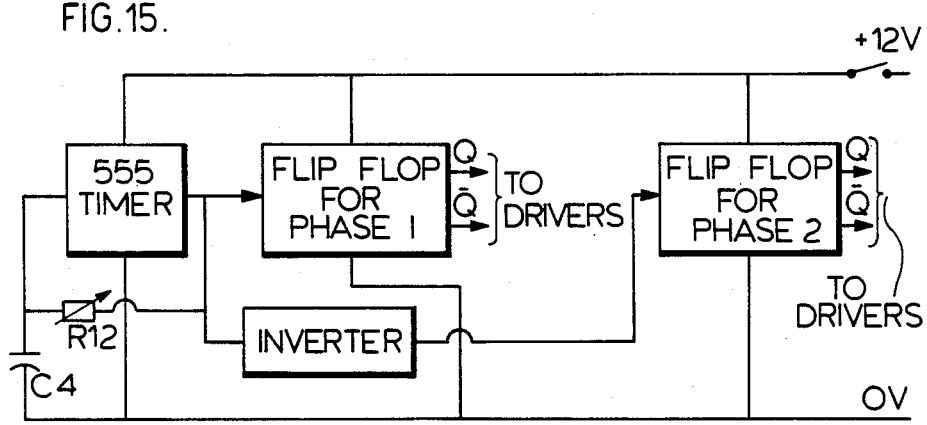
FIG. 15 illustrates a square wave generator employed in the start-up circuit of FIG. 9.

A low frequency square wave generator provides the 50% duty cycle complementary signals to switch the Q1 drivers during motor start-up, as described above with respect to FIG. 9. A square wave generator circuit is illustrated in FIG. 15. Two flip-flops and an inverter generate square waves in the proper phase relationship for the starter. The frequency of the waveforms is controlled by variable resistor R12.

The square wave generator is switched off when the CEMs can provide the switching control for the normal running circuit, by removing the positive bus voltage.

During motor starting, the conduction pulse length circuit is disabled while the square wave generator is enabled, as has previously been described. A simple tachometer enables the 4-pulse length circuits and disables the square wave generator when the motor speed has reached a given value. A circuit to achieve this is illustrated in FIG. 16.

The tachometer generates a D.C. voltage proportional to motor speed by creating a fixed pulse length during each switching cycle and by extracting the average value of the resulting pulse train by filtering. The average value is proportional to motor speed and is fed to two voltage comparators, which then provide the two switching control functions mentioned above.

Figure 17:
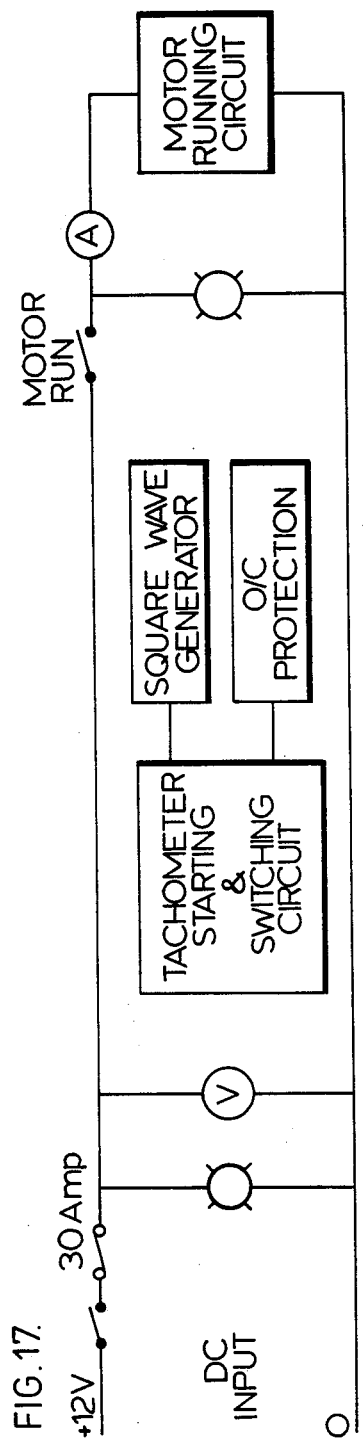
FIG. 17 illustrates the input power circuit permitting check of the starting circuit of FIG. 9 before running the motor.

An input power circuit for the various elements of the control system, including the motor running circuit and the tachometer starting and switching circuit, with associated square wave generator and overcurrent protection circuit, is illustrated in FIG. 17.

Figure 16:
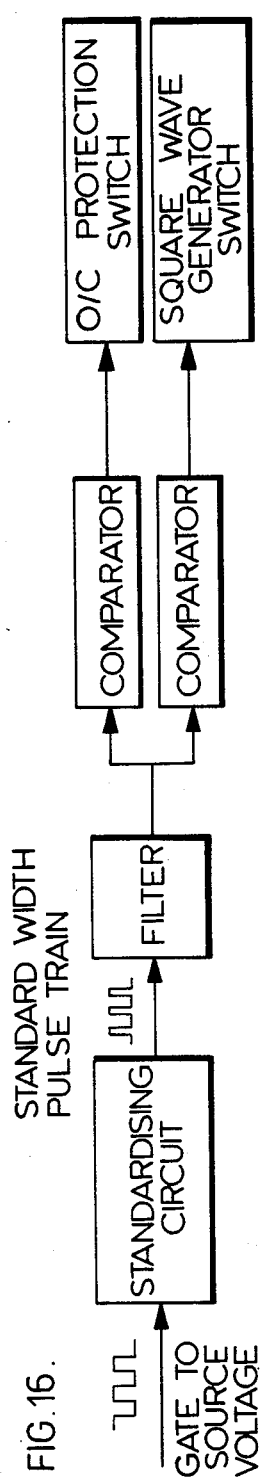
FIG. 16 illustrates schematically the tachometer and switching control employed in the start-up circuit of FIG. 9.
Figure 18:
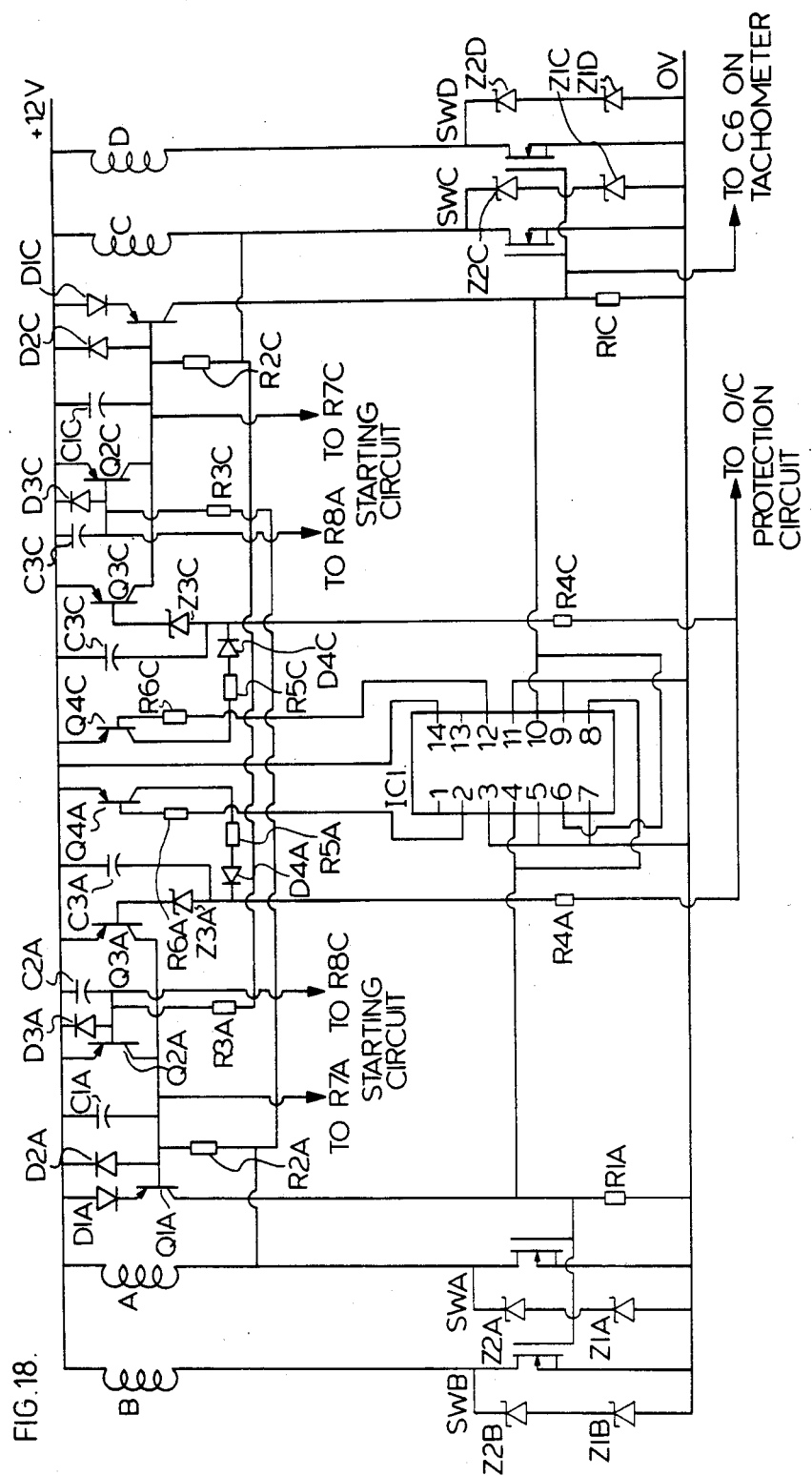
FIG. 18 shows the specific elements of the motor running circuit of the type illustrated in FIG. 6.
Figure 19:
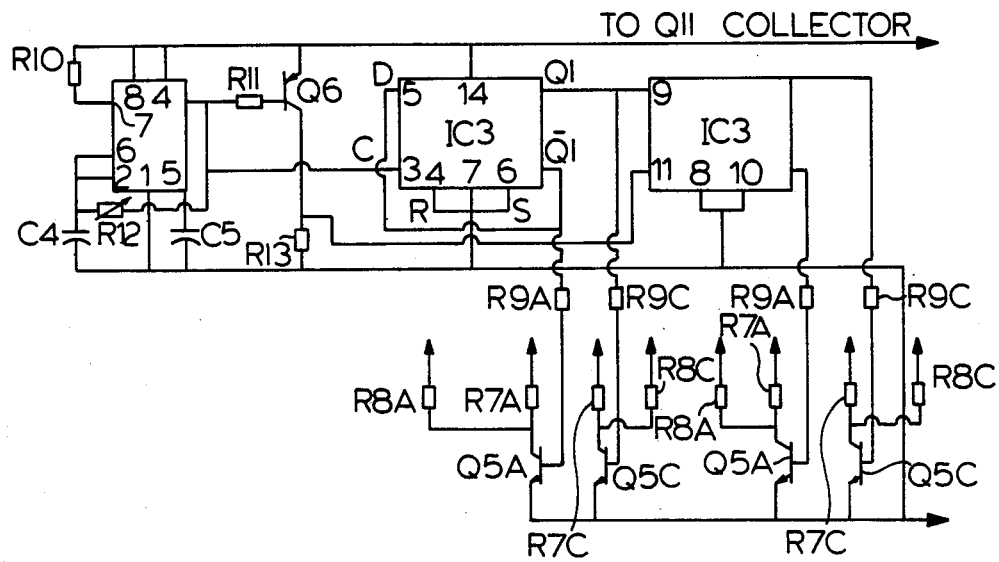
FIG. 19 shows the specific elements of a motor starting circuit of the type illustrated in FIG. 9.
Figure 20:
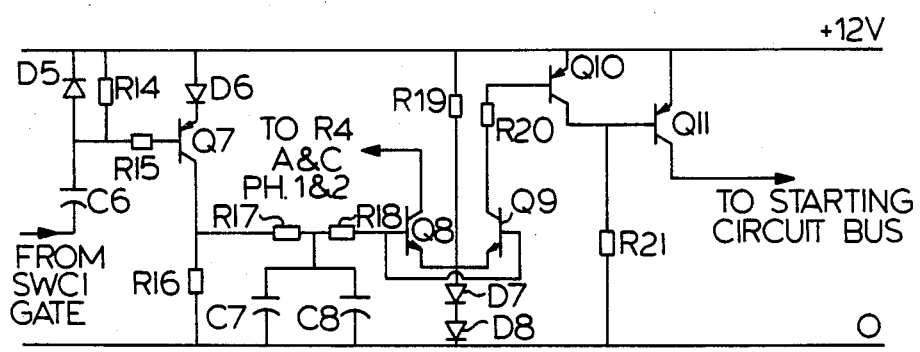
FIG. 20 shows the specific elements of tachometer and switching control illustrated in FIG. 16.

In FIGS. 18, 19 and 20, specific circuitry and components for the motor running circuit of FIG. 6, the square wave generator motor starting circuit of FIGS. 9 and 15 and the tachometer and switching control circuit of FIG. 16, respectively, are illustrated. These circuits are typical implementations of the principles of the various aspects of the motor control system described above with respect to FIGS. 6 to 17. A parts list for the circuits of FIGS. 18, 19 and 20 is provided in FIG. 21. The implementations of FIGS. 18, 19 are realized on the basis of the ready availability of hardware and do not necessarily represent a design optimization. Further optimization may be realized by including the major portion of the switching logic in a MSI chip, thereby greatly reducing printed circuit complexity and greatly increasing circuit reliability.

The above description of a specific embodiment of the invention has been made with reference to control of the split phase mode of operation of the invention. The principles thereof may also be applied to the integrated mode of operation of the invention by suitable adaptation.

As will be apparent from the foregoing description, the inherent scope of this invention is basic and broad. The invention has been described in detail in terms of a specific embodiment of the motor winding and of the electronic control system, but the principles involved may be exploited in other specific arrangements. The invention applies particularly to toroid motors, preferably a toroid motor of the type described in the aforementioned U.S. patent application Ser. No. 703,388, but also may be applied to more conventional brushless D.C. motors. A two-phase example has been used throughout. Using the winding and switching arrangements described, in a per-phase fashion, the Unipulse concepts could equally apply to a three or more phase system. Phase displacements may be adjusted to suit a particular system.

SUMMARY OF DISCLOSURE

In summary of this disclosure, the present invention relates to a new motor winding and control system which is much less costly than prior art systems. Modifications are possible within the scope of this invention.

What we claim is:

1. In a brushless direct-current motor comprising a permanent magnet rotor having a plurality of magnetic poles and a stator bearing windings arranged to interact with the magnetic field produced by the magnetic poles so as to produce torque from D.C. current applied to said windings, the improvement wherein:
    said stator windings are ranged to produce an essentially continuous torque from at least two separate phase windings from D.C. current pulses each of about one-half the duration of a two-pole cycle of rotor movement,
    each phase winding is sub-divided into a plurality of coil groups each of which is mounted in stator mounting slots in said stator displaced from the next coil group by approximately one rotor pole pitch,
    each coil group is sub-divided into two parallel winding circuits wound into the same stator slots and arranged to produce a reverse polarity in each circuit upon actuation, and
    an electronic control circuit for the motor comprising an electronic power switch for each said winding circuit arranged to be turned on and off in parallel for those winding circuits intended to be operated in parallel.

2. The brushless D.C. motor of claim 1, wherein all power switches intended to operate winding circuits in parallel are controlled from a single pulse-timing logic circuit.

3. The brushless D.C. motor of claim 2, wherein two coil groups are operated by a single logic system which controls the two coil groups so as to turn the D.C. pulse on for one of said coil groups as the D.C. pulse for the other coil group is turned off.

4. The brushless D.C. motor of claim 3, wherein said logic circuit is located at the terminals of stator windings to sense CEMF voltages of windings not carrying torque-producing electric current at the time of sensing and is arranged to employ such sensed CEMF voltages as control signals to turn on or off D.C. power pulses to the motor windings.

5. The brushless D.C. motor of claim 4, wherein an over-current protection circuit is provided in association with the power switches to limit power switches on-time under conditions likely to produce overheating in the switch.

6. The brushless D.C. motor of claim 5, wherein a starter circuit is provided which provides timed and phase-sequenced D.C. pulses to the motor windings until the motor is able to reach a speed at which the CEMF becomes sufficient to effect the pulse-timing function.

7. In a brushless D.C. dynamoelectric machine, which comprises:
- a disk-like rotor element comprising hard ferrite toroid means providing a plurality of magnetic poles of alternating polarity and mounted for rotation about its axis,
- a disk-like stator element comprising soft ferrite toroid means and mounted coaxially with and spaced apart from the rotor element, said soft ferrite toroid means being formed with radially-directed coil winding receiving slots having twice the number of the magnetic poles of said rotor element, and
- electrical coil windings mounted to said stator element in said slots and each spanning one rotor pole pitch;

the improvement wherein:
- said electrical coil windings with respect to each spanned rotor pole pitch are electrically connected in series and are wound in successive pairs of rotor-pole pitch spaced slots alternately clockwise and counterclockwise, said electrical coil windings comprise two sets of said series-connected windings with the windings of each set being located in rotor pole-pitch pairs of said slots which are offset one half rotor pole pitch, so that the windings of each set overlap each other for half a rotor pole pitch.

8. The machine of claim 7 wherein each set of said windings is subdivided into two individual coil groups each spanning one pole pitch and wound in the slots, one in a clockwise direction and the other in a counter-clockwise direction.

9. The machine of claim 8 wherein an electronic power switch is provided for each individual coil group and the electronic power switches for each set of windings are connected in parallel for simultaneous activation and deactivation.

10. A method of operating a brushless D.C. motor, comprising a permanent magnet rotor having a plurality of magnetic poles and a stator bearing at least two separate phase windings arranged to interact with the magnetic field produced by the magnetic poles and including two sets of individual electrical coils connected in series within each set and each set spanning one rotor pole pitch, the individual coils in each set being offset from each other by one-half rotor pole pitch, which method comprises the steps of:
- applying at least one and no more than two D.C. current pulses of one-half cycle duration to said windings for each two-pole cycle of rotor movement,
- effecting said D.C. current pulse application through the alternate activation and deactivation of one only electronic switch for each separate one of said phase windings, and
- sensing CEMF voltages in windings not carrying torque-producing electric current and employing the change in polarity of said sensed EMF voltages as control signals to effect said activation and deactivation of said electronic switches.

11. A method of controlling the alternate application of D.C. pulses to a brushless D.C. motor comprising a permanent magnet rotor having a plurality of magnetic poles and a stator bearing windings arranged to interact with the magnetic field produced by the magnetic poles and including two sets of individual electrical coils connected in series within each set and each set spanning one rotor pole pitch, the individual coils in each set being offset from each other by one-half rotor pole pitch, which comprises the steps of sensing CEMF voltage generated by the one of said sets of individual electrical coils to which a D.C. current pulse is not being applied, and controlling switching of the D.C. current to said one set of coils in response to a change in polarity of said sensed CEMF.

* * * * *